United States Patent [19]
Shellenbarger et al.

[11] Patent Number: 5,944,991
[45] Date of Patent: Aug. 31, 1999

[54] PIPELINE STRAINER

[75] Inventors: Thomas R. Shellenbarger, Rew; Charles J. Glover, Bradford, both of Pa.

[73] Assignee: Dresser Industries, Inc., Dallas, Tex.

[21] Appl. No.: 08/976,433

[22] Filed: Nov. 21, 1997

[51] Int. Cl.⁶ .................................................. B01D 29/56
[52] U.S. Cl. .......................... 210/232; 210/299; 210/310; 210/314; 210/445; 210/489; 210/492; 55/487; 55/502; 55/511
[58] Field of Search ..................................... 210/162, 232, 210/248, 299, 310, 312, 314, 435, 445, 446, 483, 488, 489, 492; 55/487, 502, 511; 137/550

[56] References Cited

U.S. PATENT DOCUMENTS

| | | |
|---|---|---|
| 541,183 | 6/1895 | Schermerhorn . |
| 549,390 | 11/1895 | Patterson et al. . |
| 551,044 | 12/1895 | Park . |
| 960,649 | 6/1910 | Levy . |
| 1,231,477 | 6/1917 | Bibb et al. . |
| 2,613,454 | 10/1952 | White .......................................... 35/13 |
| 2,621,755 | 12/1952 | Gray, Jr. . |
| 2,798,613 | 7/1957 | Tinker ...................................... 210/446 |
| 2,971,650 | 2/1961 | Miranda .................................. 210/447 |
| 3,372,807 | 3/1968 | Barnard . |
| 3,788,484 | 1/1974 | Godin ....................................... 210/447 |
| 3,834,539 | 9/1974 | Thompson .............................. 210/167 |
| 4,261,824 | 4/1981 | Cuschera . |
| 4,264,446 | 4/1981 | Fregeau ................................... 210/356 |
| 4,406,326 | 9/1983 | Wagner . |
| 4,543,114 | 9/1985 | Beattie et al. ............................. 55/418 |
| 4,582,605 | 4/1986 | Rea et al. ................................. 210/447 |
| 4,678,589 | 7/1987 | Ayres ....................................... 210/797 |
| 5,186,828 | 2/1993 | Mankin . |
| 5,336,299 | 8/1994 | Savell . |
| 5,509,437 | 4/1996 | Merrett . |

FOREIGN PATENT DOCUMENTS 527354  10/1940  United Kingdom .

*Primary Examiner*—Jay H. Woo
*Assistant Examiner*—Fred Prince
*Attorney, Agent, or Firm*—Daniel Rubin

[57] ABSTRACT

A pipeline strainer having a body defining a rectilinear flow passage between an inlet and an outlet and a cylindrical cavity centrally located therebetween. A removable cover of cup-like configuration is secured in a sealed relation to the body subtending the body cavity in which a dual layered strainer assembly is supported in the flow passage in a sealed relation between an interior surface of the cover and an interior surface of the cavity.

12 Claims, 5 Drawing Sheets

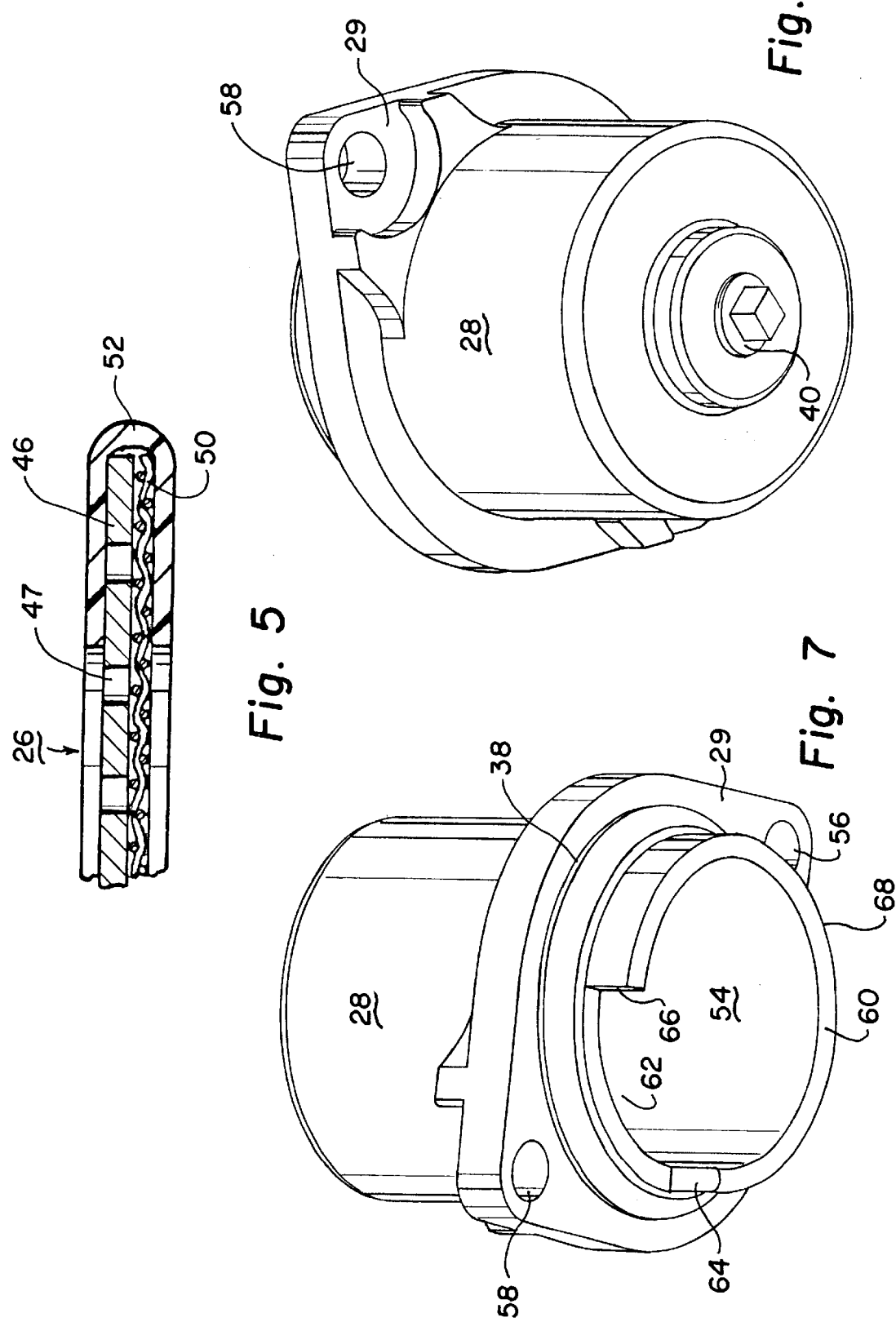

PIPELINE STRAINER

FIELD OF THE INVENTION

The field of art to which the invention pertains includes the art of strainers utilized in a piping system for removing debris from the flow of line content.

BACKGROUND OF THE INVENTION

Strainers have long been used in piping systems for the collection of debris entrained in flowing fluids within the system. Whether the fluid is gas or liquid, use of the strainer is essential particularly in those applications in which processed particles habitually tend to become entrained in the fluid. The strainers in such applications serve to collect the entrained particles that could otherwise accumulate and adversely affect both the flow and quality of the fluid. At the same time, removal of debris tends to avoid damage to downstream equipment such as flow meters, valves, etc. Since such strainers typically provide a cleanout access, periodic maintenance enables the system to remain reasonably clean of debris.

Exemplifying pipeline strainers utilizing a generally elliptical type strainer element are the disclosures of U.S. Pat. Nos. 549,390; 960,649; 3,834,539; 4,264,446; and 4,678,589.

While such strainers undoubtedly function well, they are generally characterized by the absence of a simple construction, a replaceable strainer element, a relatively high pressure drop across the strainer element even when clean and inconvenient serviceability.

OBJECTS OF THE INVENTION

It is therefore an object of the invention to provide a strainer device of relatively simple construction for in-line piping service to collect entrained debris in the line content of fluid flow.

It is a further object of the invention to effect the previous object with an in-line strainer characterized by a low cost construction and easily replaceable and/or serviceable strainer element.

It is a still further object of the invention to effect the previous objects with a strainer affording a relatively low pressure drop across the strainer element.

SUMMARY OF THE INVENTION

This invention relates to a novel construction for a pipeline strainer apparatus. More specifically, the invention hereof relates to a strainer unit characterized by a cost effective construction affording attributes not previously contained in like-purpose pipeline strainers of the prior art.

The foregoing is achieved in accordance with the invention by a strainer having a body defining a thru passage extending between inlet and outlet connections for a pipeline installation. Centrally intermediate between the inlet and outlet is a cylindrical cavity supporting an elliptical, dual layered strainer element. The strainer element is secured diagonally in place between the interior end of a removable cup-like cover and an opposite interior surface of the cavity. Placement of the cover urges the strainer element downward to its lowest point at which the element is compressed into a circumferentially sealed relation with the surrounding surfaces thereat. A protrusion provided at the inwardly distal end of the cover includes an arcuate recess through which to receive the strainer element for positioned placement. Removing the cover affords access to the strainer element enabling the strainer element to be removed for maintenance purposes or replaced.

The strainer element per se is formed to provide stiffness against flow and when clean provides a relatively low pressure drop in the direction of flow. The strainer element comprises an assembly of a pair of superimposed elliptical elements that are circumferentially sealed together about their periphery with a molded elastomeric section that interfaces against the cylindrical cavity. The downstream of the elements is of a foraminous metal construction that includes a ribbed reinforcement while the upstream element comprises a metal screen. The dual elements together provide a simple interface between upstream and downstream piping along with a molded elliptical seal ring that maintains the strainer element in a sealed relation to the surrounding wall surfaces.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 5 is a fragmentary sectional view of the strainer assembly elements of FIGS. 3 and 4 in their secured relation;

FIG. 6 is an underside perspective view of the removable access cover for servicing and securing the strainer assembly hereof; and FIG. 7 is a topside perspective view of the access cover hereof.

DESCRIPTION OF THE PREFERRED EMBODIMENT

Figure 1:
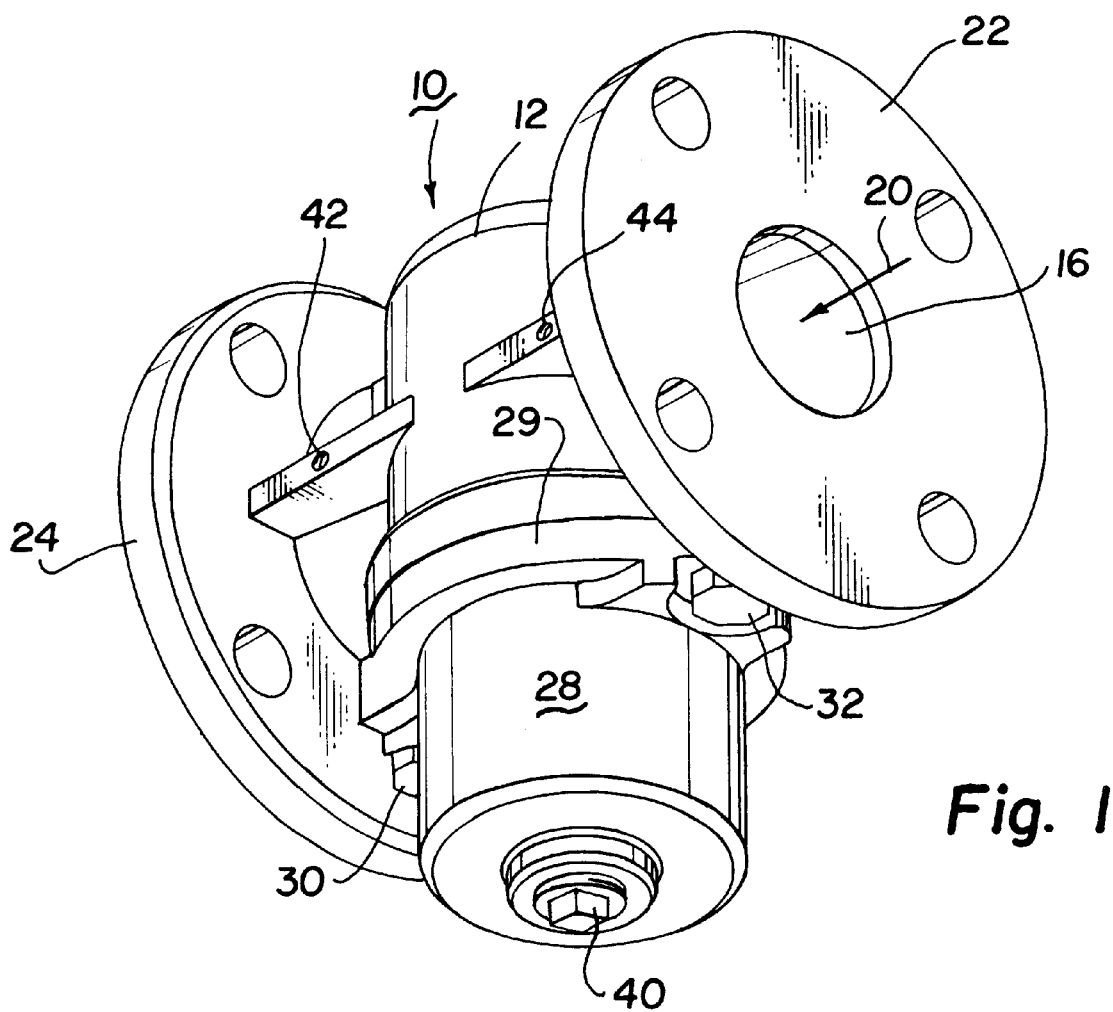
FIG. 1 is a perspective underside view of a pipeline strainer in accordance with the invention.

In the description which follows, like parts are marked throughout the specification and drawings with the same reference numerals respectively. The drawing figures are not necessarily to scale and in certain views, parts may have been exaggerated for purposes of clarity.

Referring now to the drawings, the strainer in accordance with the invention hereof is designated 10 and is comprised of a body 12 of ductile iron, steel or other suitable material. Within the body there is defined a through passage from an inlet 16 to an outlet 18 enabling flow in the direction represented by arrows 20. The inlet and outlet ends include integral flanges 22 and 24 respectively for installing the strainer into a pipeline in which it is to be utilized. Optionally, threaded or weld ends could be substituted for the flanges as is well known in the art.

Centrally intermediate the inlet and outlet is a cylindrical recessed chamber 14 containing and supporting a removable strainer assembly 26 as will be described. Providing access and support for the strainer assembly 26 is a vertically extending cup-shaped cover 28 secured at flanges 29 via capscrews 30 and 32 to body 12. An elastomeric O-ring 34 secured between a shoulder 36 of the body and a chamfered face 38 of the cover maintains a sealed relation therebetween. A pipe plug 40 received in tapped bore 41 can be unthreaded and withdrawn for drainage or blowdown purposes prior to removing cover 28 by removing cap screws 30 and 32. A valve (not shown) can be connected at bore 41 and alternatively be used for these purposes. Test ports 42 and 44 (FIG. 1) are optionally provided whereby a pressure probe can be used to ascertain differential pressure drop across strainer assembly 26 to establish a need for maintenance.

Figure 3:
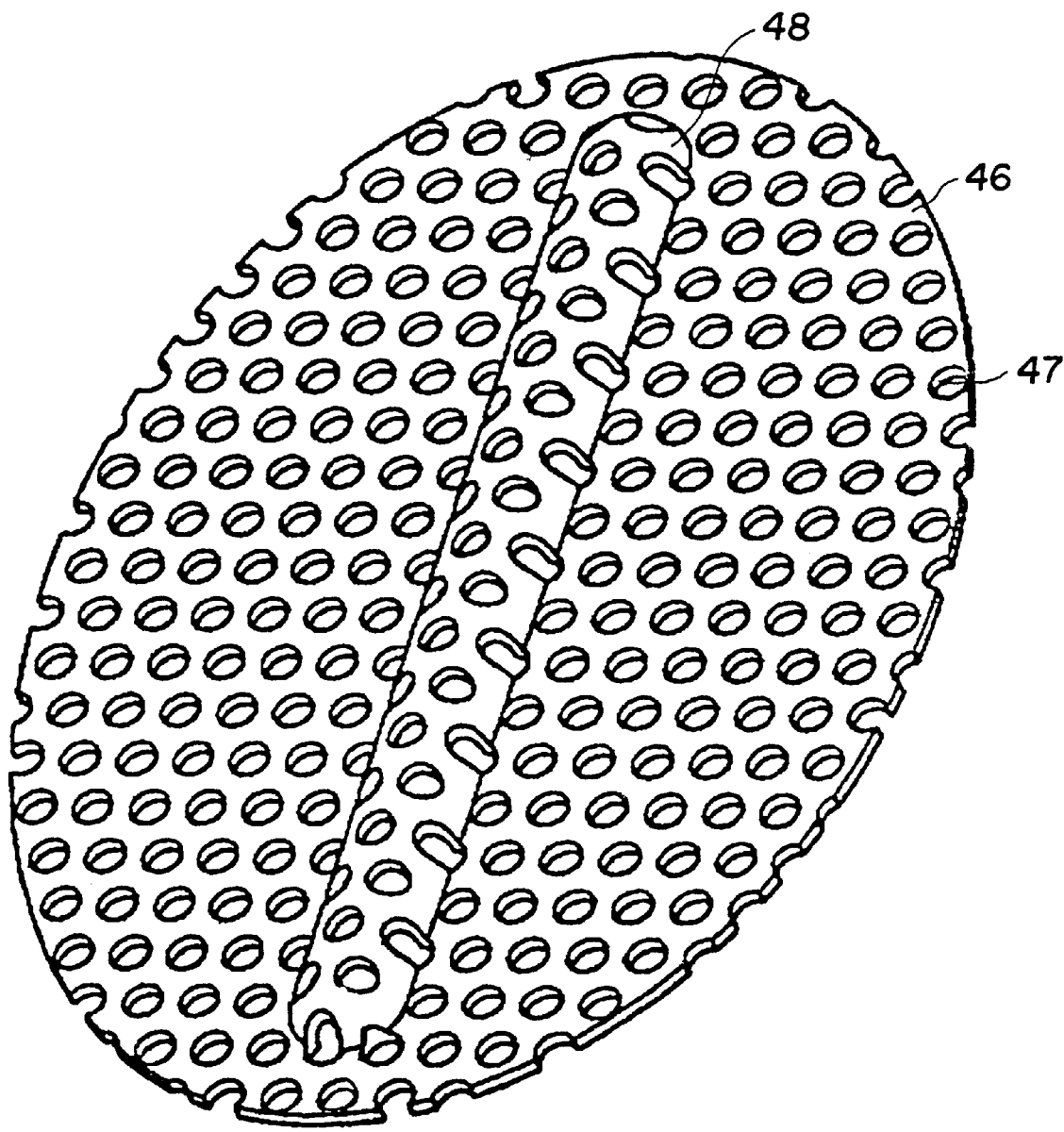
FIG. 3 is a top perspective view of the downstream element of the strainer assembly.
Figure 4:
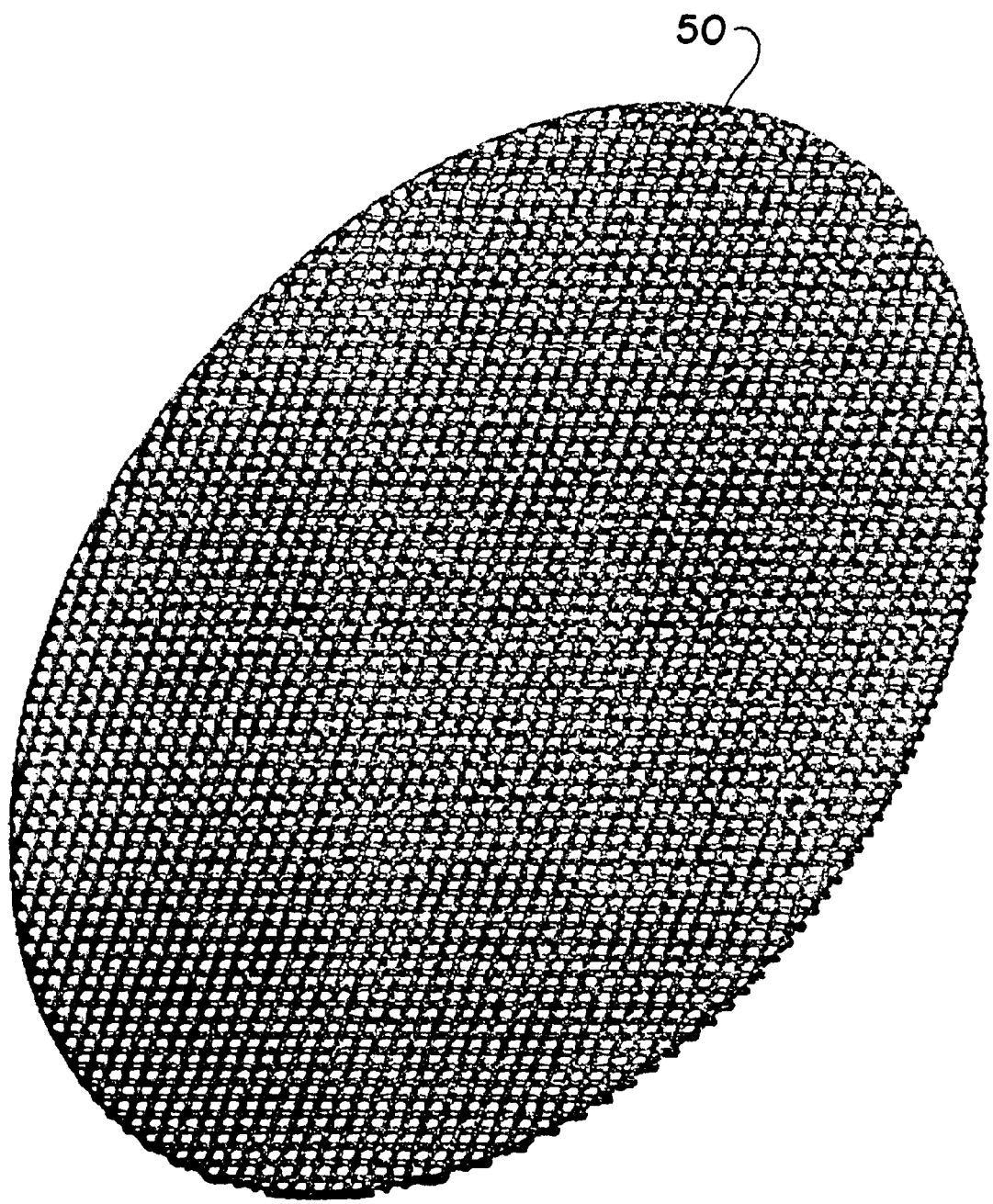
FIG. 4 is a top perspective view of the upstream element of the strainer assembly.

Construction of the strainer assembly 26 can be best understood by reference to FIGS. 3–5 that illustrate a foraminous backup plate 46 with uniformly distributed apertures 47. Included on the downstream surface is a raised central rib 48 affording structural integrity and orientation as will be understood. Backup plate 46 is of elliptical configuration and is comprised of a firm metal composition such as stainless steel 18-8 or other material compatible with the system liquid or gas with which it is to be utilized.

Figure 2:
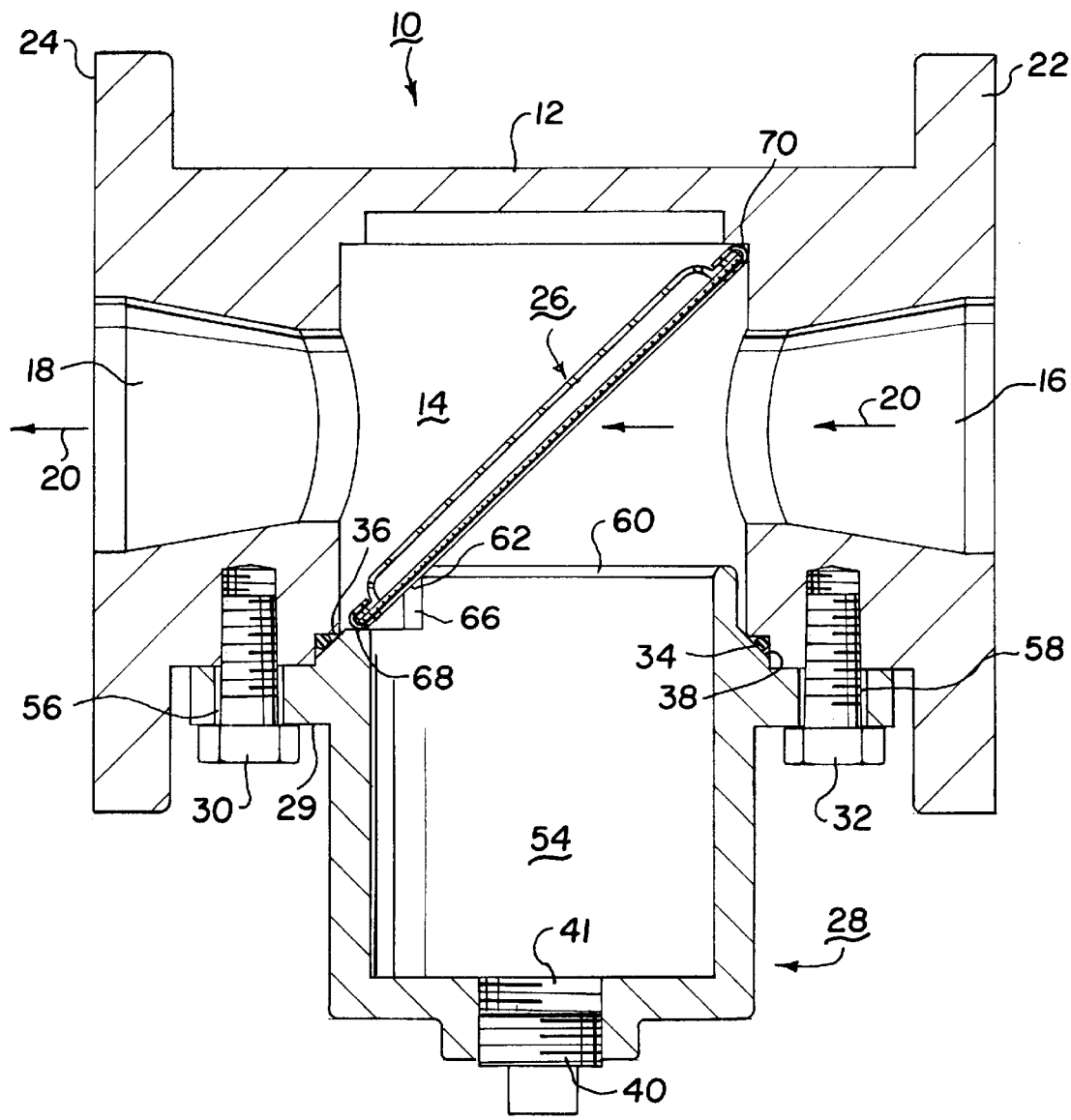
FIG. 2 is a sectional elevation view through the strainer of FIG. 1 in a preferred installed orientation.

Comprising the symetrical upstream portion of strainer assembly 26 is a fine mesh screen 50, typically of between about 20–100 mesh, of like elliptical size and diameter as backup plate 46. Securing the backup plate and screen together as a unit is an elastomeric seal 52 of composition likewise compatible with the liquid or gas content of the pipeline that is molded or otherwise affixed to encircle and secure the exterior elliptical diameters of both backup plate 46 and screen 50. With reference to FIGS. 6 and 7, it can be seen that cover 28 is cylindrically cup-shaped including an internal cavity 54 in which debris can accumulate and a removable pipe plug 40 for drainage or blowdown when required. Integral flange 29 enables mounting and removal of the cover via capscrews 30 and 32 extending through apertures 56 and 58 into body 12. To accommodate and support the lower end of strainer assembly 26, the distal inward end 60 of the cup is formed as a circumferentially incomplete protrusion so as to define a limited arcuate recess 62 between opposing ends 64 and 66. The arcuate extent of recess 62 provides close accommodation for the strainer assembly that when installed is oppositely compressed between the lower corner 68 (FIG. 2) and the upper body corner 70.

When in service, plug 40 can be periodically removed for blowdown of any debris contained in cavity 54 of cover 28. If an alternative valve is attached for that purpose, it could be similarly operative. Should it be desired to service and/or replace strainer assembly 26, the entire cover 28 can conveniently be removed by the mere removal of capscrews 30 and 32. After cleaning and/or replacement of the strainer assembly, it can conveniently be set diagonally, as illustrated, by positioning the lower end of the strainer assembly within recess 62 while capscrews 30 and 32 are tightened to secure the cover in place.

The entire strainer represents a highly simplistic structure for screening debris from within the flow of line content while affording a high order of maintenance serviceability when required. By virtue of cavity 14 comprising a cylindrical bore, the entire assembly represents a relatively low cost construction. With the elliptical strainer assembly being sealed about its periphery with a molded elastomeric section interfaced against the cylindrical bore, sealing is provided therebetween and prevents localized leakage from occurring. At the same time, downward deflection of debris to within cover cavity 54 affords extended service intervals while relatively large apertures 47 in backup plate 46 tend to substantially avoid or minimize restriction. An open surface area of about forty (40) percent in backup plate 46 affords a minimum 3:1 ratio of element area to body bore and serves to minimize pressure loss across the strainer assembly.

By the above description there is disclosed a novel construction for a pipeline strainer able to remove debris from pipeline flow. It utilizes a superior form of strainer assembly comprised of superimposed elements secured in place by a removable cup-like cover. The cover not only serves to accumulate debris but also serves to position and align the strainer assembly within the cylindrical cavity 14. Performing maintenance is relatively simple in that blowdown can be effected by the mere removal of plug 40 causing any debris within cavity 54 to be ejected or by entirely removing the cover by the mere unthreading of oppositely positioned capscrews 30 and 32. Being relatively simple and relatively inexpensive to fabricate, the construction thereof affords many virtues not available in the construction of similar purpose strainers of the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A strainer for the flowing fluid content of a pipeline comprising:

a body defining a rectilinear flow passage extending between an inlet and an outlet and an internal cavity defined by an interior surface centrally therebetween;

a removable cover secured in a sealed relation to said body with an interior surface thereof opposite said cavity; and a removable elliptically shaped strainer assembly diagonally positioned in said cavity in sealed relation between the interior surface of said cover and an interior surface of said cavity;

said strainer assembly comprising an upstream elliptical screen and a foraminous downstream elliptical backup plate overlying said screen and a seal securing said backup plate in a superposed relation to said screen while in cooperation with the surrounding surface thereat effecting the sealed relation of said strainer assembly.

2. A strainer in accordance with claim 1 in which when said cover is removed from said body, said strainer assembly is accessibly removeable from said body cavity.

3. A strainer in accordance with claim 1 in which said backup plate includes a structural reinforcement on its downstream surface.

4. A strainer in accordance with claim 3 in which said structural reinforcement comprises an elongated rib.

5. A strainer in accordance with claim 1 in which said cover is comprised of a cup-like configuration defining an internal cavity in which strained debris from said pipeline content can accumulate.

6. A strainer in accordance with claim 5 including a removable pipe plug on a distal exterior surface of said cover and effective when removed to permit blowdown of debris from within the cavity of said cover.

7. A strainer in accordance with claim 5 in which said cup-like configuration terminates at a distal end of said cover located inward of said body and includes a limited recess through which said strainer assembly can extend for placement and positioning.

8. A strainer in accordance with claim 7 including a protrusion on the inwardly distal end of said cover and said recess extends arcuately within said protrusion.

9. A strainer in accordance with claim 1 in which said foraminous backup plate includes a relatively high open surface area.

10. A strainer in accordance with claim 9 in which said backup plate has an element area to body bore area in a minimum ratio of about 3:1.

11. A strainer in accordance with claim 1 in which the seal of said strainer assembly comprises an elastomeric composition secured about the exterior elliptical perimeter of said backup plate and said screen.

12. A strainer in accordance with claim 11 in which said seal is molded about said elliptical perimeters.

* * * * *